United States Patent [19]

Helmlinger et al.

[11] 3,896,175

[45] July 22, 1975

[54] 3,7-DIMETHYL-OCTA-2,6-DIENYL-MERCAPTAN

[75] Inventors: Daniel Helmlinger, Dubendorf; Dietmar Lamparsky, Wangen-Dubendorf; Peter Schudel, Grut; Jost Wild, Zurich; Trudi Sigg-Grutter, Winterthur, all of Switzerland

[73] Assignee: Givaudan Corporation, Clifton, N.J.

[22] Filed: May 8, 1972

[21] Appl. No.: 251,060

[30] Foreign Application Priority Data
Mar. 17, 1972 Switzerland.................. 7772/71

[52] U.S. Cl.............. 260/609 R; 426/221; 426/222; 426/175; 260/455 B; 260/564 E
[51] Int. Cl.²........................................ C07c 149/08
[58] Field of Search.......... 260/609 R, 405; 424/333

[56] References Cited
UNITED STATES PATENTS
3,429,970  2/1969  Rüegg et al........................ 424/333
3,655,700  4/1972  Siddall.............................. 260/405

FOREIGN PATENTS OR APPLICATIONS
1,116,216  11/1961  Germany..................... 260/609 A
188,961   12/1966  U.S.S.R....................... 260/609 A

OTHER PUBLICATIONS

Theilheimer, p. 19.
Houben – Weyl; pp. 15–18.
Chem. Abstracts, p. 4091B.
Index Chemicus(3), 102, 804 (1968).
Reid – "Mercaptans" p. 15–16.

*Primary Examiner*—Lewis Gotts
*Assistant Examiner*—D. R. Phillips
*Attorney, Agent, or Firm*—Thomas Cifelli, Jr.

[57] ABSTRACT

The preparation and use of the novel 3,7-dimethyl-octa-2,6-dienyl-mercaptan as a new odorant and flavorant is disclosed.

1 Claim, No Drawings

3,7-DIMETHYL-OCTA-2,6-DIENYL-MERCAPTAN

FIELD OF THE INVENTION

This invention relates to the field of fragrances and flavors, and more especially to odorant compositions and foodstuffs.

DESCRIPTION OF THE PRIOR ART

None.

SUMMARY OF THE INVENTION

The invention relates to a new odorant and/or aroma substance, namely 3,7-dimethyl-octa-2,6-dienylmercaptan (thiogeraniol) having the formula

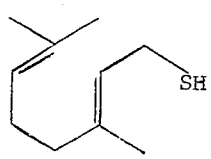

I

The invention also relates to a process for the manufacture of the compound I, its use as an odorant or its use for aromatizing foodstuffs and/or delicacies and odorant compositions or foodstuffs, delicacies and/or aromatizing agents, characterized by a content of the compound I effective for olfactory and flavoring purposes.

Formula I is intended to include both of the possible cis-trans isomers.

The novel compound (I) in accordance with this invention can be obtained by treating a compound of the formula

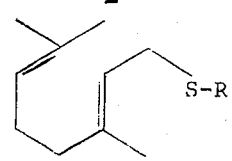

II wherein R signifies a residue which can be cleaved off by hydrolysis, with a base.

DESCRIPTION OF THE PREFERRED EMBODIMENTS

In carrying out the process for the preparation of the novel compound I of this invention, starting materials II in which the residue R is

 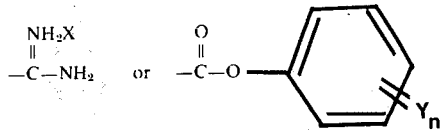

(a)                          (b)

are advantageous. X represents the anion of an acid, for example a hydrohalic acid (such as hydrofluoric, hydrochloric, hydrobromic or hydriodic (acid), a lower alkanesulphonic acid (such as methanesulphonic acid), a benzenesulphonic acid or a lower alkyl-benzenesulphonic acid (such as p-toluenesulphonic acid), Y signifies halogen, especially chlorine, lower alkyl or nitro and $n$ a whole number from 0 to 5, preferably = 1 or 2.

Examples for the residue (b) are:

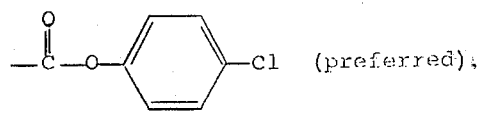 (preferred); 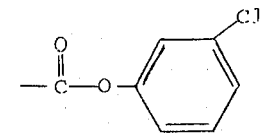

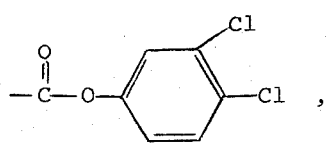 , 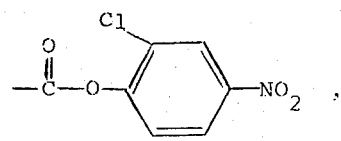 , or

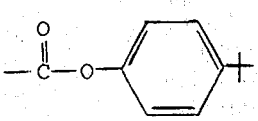

Inorganic or organic bases may be used. Examples of inorganic bases are alkali metal hydroxides such as sodium or potassium hydroxide; alkaline earth metal hydroxides such as calcium hydroxide; alkali carbonates such as sodium or potassium carbonate. Examples of organic bases are amines, for example alkylamines such as methylamine or ethylamine, or heterocyclic amines, for example pyridine or piperidine.

According to a preferred embodiment of the process in accordance with this invention, geranylthiouronium tosylate

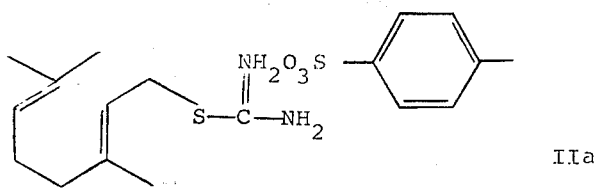

IIa is used as the starting substance. The treatment with the base is expediently effected in aqueous medium. The reaction temperature can lie between about 0° and 110°C. A preferred temperature range is that from 10–30°C.

The compound of formula IIa can be obtained by bringing a geranylthiouronium halide

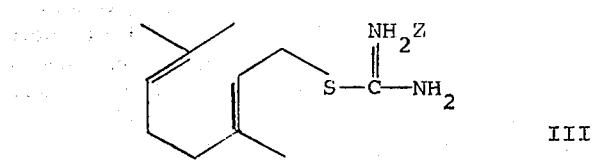

III wherein Z signifies halogen, preferably geranylthiouronium bromide, to reaction with p-toluenesulphonic acid or a reactive derivative thereof in the usual and known manner.

The compound of formula III can, in its turn, be obtained by reacting linalool or geraniol with hydrogen halide, preferably hydrogen bromide, in the presence of thiourea. There thereby primarily results (by allyl rearrangement in the case of linalool) the geranyl halide of the formula

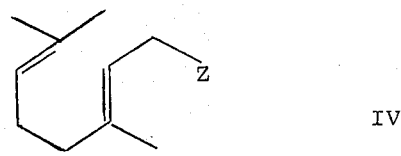

IV wherein Z has the above significance, (thus, for example, geranyl bromide) which then reacts with the thiourea present to give the thiouronium compound III.

The reaction of linalool or geraniol with, for example, hydrogen bromide is expediently effected at −20° to 100°C, preferably at 10° to 30°C.

In accordance with a further process variant, a halogen compound of formula III (preferably the bromide) can also serve as the starting material. In this case, it is expedient to work under the same conditions as have been given above for the conversion of the compound of formula IIa into the compound of formula I.

In accordance with a further process variant, a compound of formula III manufactured in situ can also be reacted under the influence of a base to give a compound I, for example by reacting a halide IV with thiourea in a high-boiling solvent, for example triethyleneglycol. After termination of the reaction (ca 30 minutes), the reaction mixture containing the compound of formula III is treated with a high-boiling amine (e.g. triethylenepentamine), the thiouronium halide III being saponified to the compound I (cf Cossar et al., J. Org. Chem. 27, 93–95 (1962)).

When a compound of formula II wherein R signifies the residue (b) is employed as the starting material for the process in accordance with the invention, one can proceed according to Garmaise et al. J. Org. Chem., 27, 4509–12 (1962) and Clive, Chem. Commun. 1014–15 (1970).

The compound of formula I (thiogeraniol) in accordance with this invention particularly possesses aroma and odorant properties, especially interesting berry notes as well as an interesting grape fruit note. It can accordingly be used for aromatizing foodstuffs and delicacies as well as drinks or as an odorant for the manufacture of odorant compositions such as perfumes, or can find use for perfuming technical or cosmetic products of all kinds, for example solid and liquid detergents, synthetic washing agents, aerosols, soaps, creams, lotions. The novel compound I finds use in perfumery on the basis of its warm, earthy, spicy, green, slightly sulphurous note and its good adhesiveness. It is especially suitable in the manufacture of perfume bases with lavender-like notes. The fragrance characteristic of such bases is modified in an advantageous manner by the addition of the thiol in accordance with this invention.

The content of the novel compound I in odorant compositions or in the perfumed products can vary within wide limits, for example between about 0.001 and about 5 wt. %, preferably between about 0.01 and about 1 wt. %.

The flavor of the compound I can be designated as greenish, spicy and woody. The compound may be used in the manufacture of certain artificial fruit aromas, especially in the manufacture of cassis aroma (aroma of blackcurrants). Here it can especially find use as an aroma component in the manufacture of cheap "synthetic" buccu leaf oil. Natural buccu leaf oil which has hitherto found use as an aroma component for the production of cassis aroma is expensive and its price constantly climbs, as the demand exceeds the supply. However, readily accessible raspberry aromas of natural origin can also be changed into cassis aromas by addition of thiogeraniol. An addition of about 0.05–0.5%, preferably ~ 0.2% of thiogeraniol is sufficient for this.

The new compound of formula I can accordingly be used for producing cassis aromas in foodstuffs (e.g. milk drinks, yoghurt, etc.), in delicacies (e.g. confectionery products such as bon-bons, soft ice, etc.) and in drinks (e.g. mineral waters, syrups). The pronounced flavorous qualities of the compound I makes use in small concentrations possible. A suitable dosage includes, for example, the range of 10 ppb–100 ppm, preferably of 50–500 ppb, in the finished product.

The compound I is of special flavorous interest, as has surprisingly been found, when it is used in conjunction with a monoterpene alcohol such as, for example, α-terpineol. In this case the aroma properties of the thiol come particularly impressively into play.

The following examples illustrate the present invention, without however being limitative thereof.

EXAMPLE 1

190 g. of geranylthiouronium tosylate are introduced into a solution of 60 g. of sodium hydroxide in 250 ml. of water and the mixture is stirred for two hours. The resulting thiogeraniol is removed from the alkaline emulsion by steam-distillation, taken up in 2 liters of ether, the ethereal solution is washed neutral three times with 200 ml. of saturated common salt solution each time, thereupon dried over anhydrous magnesium sulphate and the ether evaporated in vacuum. The resulting crude product displays the following composition:

90% thiogeraniol (ratio of the double-bond isomers = 6:1)
5% α-terpineol
5% by-products By fractional distillation there are obtained 85 g. of thiogeraniol of boiling point 58°C/0.35 mmHg, $n_D^{20}$ = 1.5030, purity ca 95% (by-product: α-terpineol).

The geranylthiouronium tosylate used as the starting material can be obtained as follows:

154 g. of linalool, 83.6 g. of thiourea and 124.5 ml. of 48% aqueous hydrogen bromide are mixed, with stirring, in a 500 ml. round flask. In so doing the turbid mixture firstly cools to ca 10°C, slowly becomes clear and after ca 15 minutes warms to 40°–50°C, turbidity again setting in. After stirring at 20°C for 20 hours, the resulting geranylthiouronium bromide is completely crystallized out. The resulting suspension is treated with 192.0 g. of p-toluenesulphonic acid in 400 ml. of water and the geranylthiouronium tosylate formed is filtered off after 15 minutes. It is washed twice with 100 ml. of water each time.

EXAMPLE 2

A synthetic buccu leaf oil having the following composition was prepared:

| | parts by weight |
|---|---|
| thiogeraniol | 0.15 |
| α-pinene | 0.10 |
| myrcene | 0.15 |
| limonene | 1.00 |
| menthone | 1.40 |
| isomenthone | 2.60 |
| pulegone | 0.80 |
| pulegyl acetate | 0.15 |
| α-terpineol | 0.10 |
| geraniol | 0.04 |
| methyleugenol | 0.10 |
| cedryl acetate | 0.05 |
| eucalyptol | 0.30 |
| terpinen-4-ol | 0.15 |

EXAMPLE 3

A natural raspberry aroma consisting of 100 parts by weight of raspberry distillate, 400 parts by weight of raspberry juice concentrate and 100 parts by weight of sugar syrup is treated with 0.2 parts by weight of thiogeraniol. The original raspberry aroma thereby obtains the typical cassis note and can now find use as a cassis aroma.

EXAMPLE 4

Odorant composition (lavender type) with a content of a compound of formula I having the following formulation was prepared:

| | parts by weight |
|---|---|
| thiogeraniol (1% in phthalic acid diethyl ester) | 40 |
| linalyl formate | 10 |
| cistambral (10% in phthalic acid diethyl ester) | 10 |
| undecylenaldehyde (1% in phthalic acid diethyl ester) | 10 |
| methylionone | 10 |
| neroli oil | 10 |
| resinoid vanille | 10 |
| verveine esteral | 10 |
| civet nat. defatted (10% in phthalic acid diethyl ester) | 10 |
| resinoid ciste labdanum | 10 |
| benzylisoeugenol | 20 |
| tangerine oil | 50 |
| bergamotte oil | 100 |
| menthyl acetate | 100 |
| lavender oil | 600 |
| | 100 |

The addition of the thiogeraniol imparts to the lavender composition a greener and more herby fragrance.

What is claimed is:

1. 3,7-Dimethyl-octa-2,6-dienyl-mercaptan.

* * * * *

UNITED STATES PATENT OFFICE
CERTIFICATE OF CORRECTION

Patent No. 3,896,175  Dated July 22, 1975

Inventor(s) Daniel Helmlinger et al.

It is certified that error appears in the above-identified patent and that said Letters Patent are hereby corrected as shown below:

Column 6, Example 4, total of the formula "100" should read -- 1000 --.

Signed and Sealed this twenty-first Day of October 1975

[SEAL]

Attest:

RUTH C. MASON
Attesting Officer

C. MARSHALL DANN
Commissioner of Patents and Trademarks